UNITED STATES PATENT OFFICE.

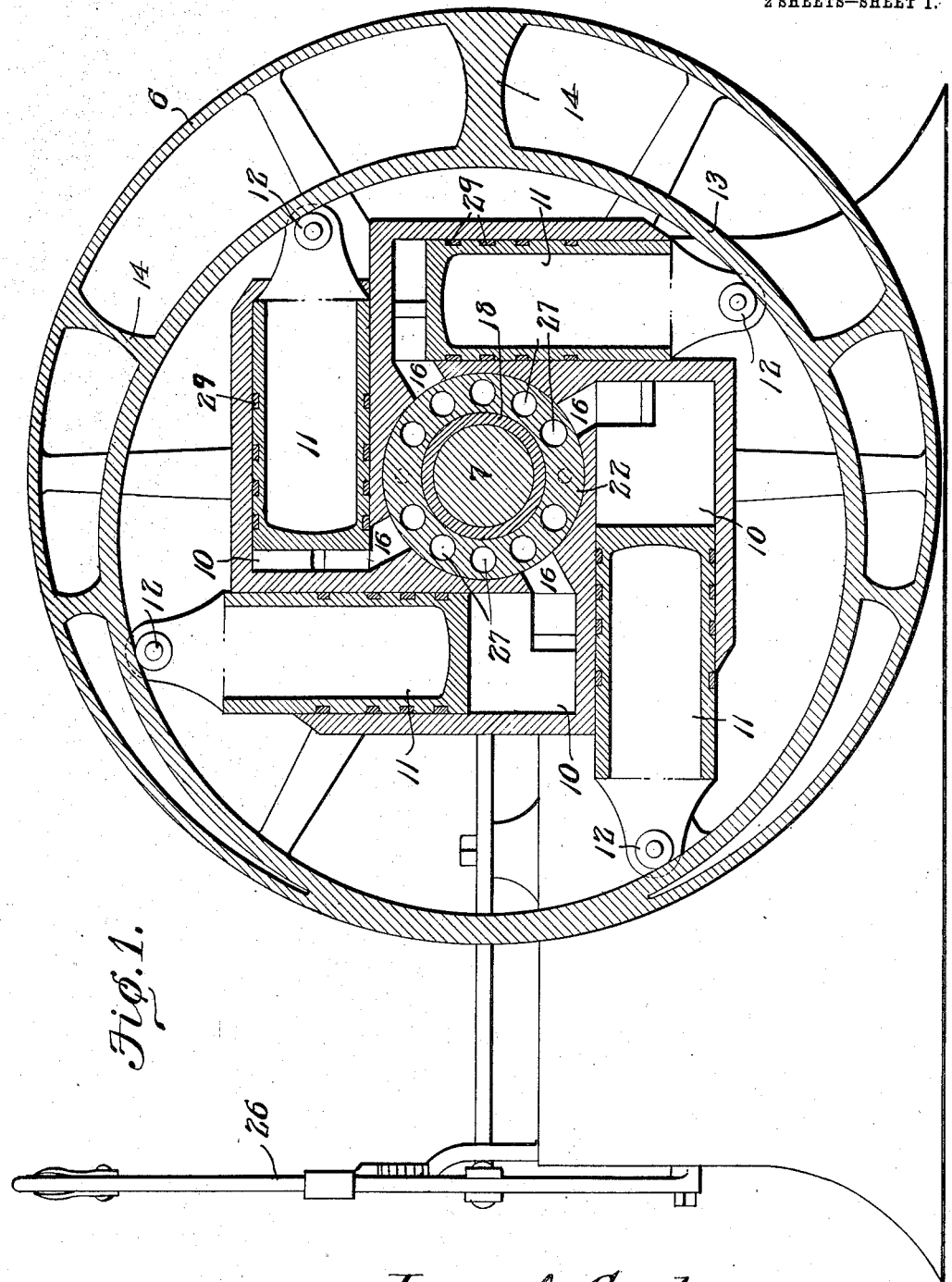

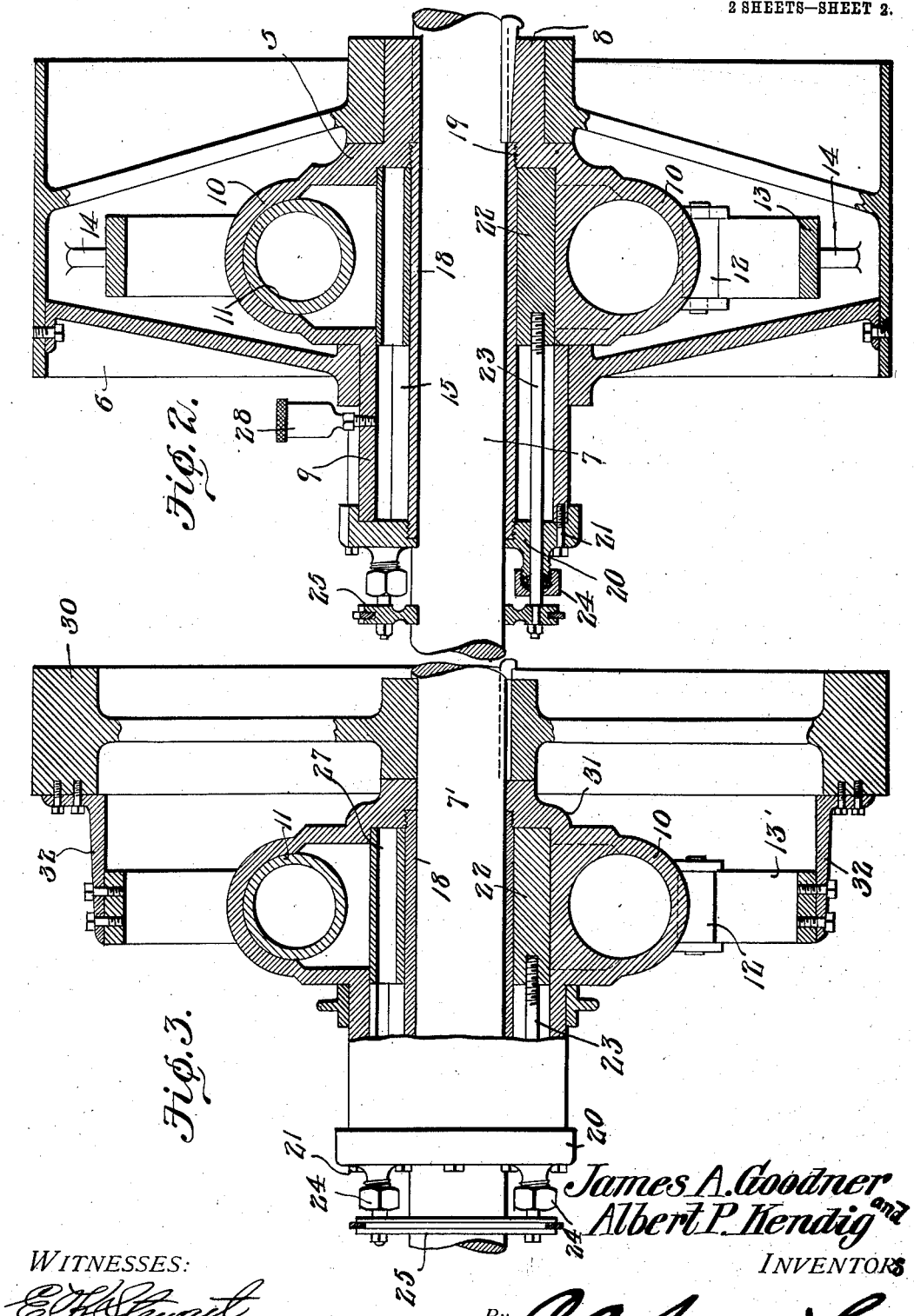

JAMES ANDREW GOODNER AND ALBERT PAUL KENDIG, OF ROCKY FORD, COLORADO.

VARIABLE-SPEED MECHANISM.

No. 851,129.      Specification of Letters Patent.      Patented April 23, 1907.

Application filed March 12, 1906. Serial No. 305,675.

*To all whom it may concern:*

Be it known that we, JAMES ANDREW GOODNER and ALBERT PAUL KENDIG, citizens of the United States, residing at Rocky Ford, in the county of Otero and State of Colorado, have invented a new and useful Variable-Speed Mechanism, of which the following is a specification.

This invention relates to variable speed mechanism for shafting, pulleys, clutches and other machinery and has for its object to provide means whereby a driven element may be caused to rotate at any degree of speed relatively to and less than that of the driving element.

A further object of the invention is to provide mechanism of the class described in which the speed of one of the moving elements is controlled by fluid pressure actuated devices carried by the other element.

A further object is to form the driving element with a plurality of cylinders having pistons arranged therein and movable to operative position in engagement with the driven element by a body of oil, gas, or other fluid circulating in said cylinders, the flow of fluid from one cylinder to another being controlled by a valve thereby to vary to pressure exerted on the pistons.

A still further object is to form the valve with longitudinal fluid passages or recesses to prevent undue pressure on said valve when in open position, and also to permit the passage of fluid to the cylinders when the latter are refilled.

With these and other objects in view the invention consists in the construction and novel combination and arrangement of parts hereinafter described and illustrated in the accompanying drawings, it being understood that various changes in form, proportions and minor details of construction may be resorted to within the scope of the appended claims.

In the accompanying drawings forming a part of this specification: Figure 1 is a longitudinal sectional view of a variable speed mechanism constructed in accordance with my invention. Fig. 2 is a transverse sectional view of the same. Fig. 3 is a similar view illustrating a modified form of the invention.

Similar numerals of reference indicate corresponding parts in all of the figures of the drawings.

The improved mechanism may be used in connection with any kind of machinery in which it is desired to regulate or vary the speed of a driven element with respect to a driving element and by way of illustration is shown as a means for imparting motion from a driving member 5 to a driven member or pulley 6. The driving member 5 is keyed to a shaft 7 and consists of a casting provided with laterally extending flanges 8 and 9 upon which is mounted for rotation the pulley or driven member. The casting is molded or otherwise formed with a plurality of recesses preferably four in number as shown, and forming cylinders 10 in which are mounted for reciprocation suitable pistons 11, the ends of which are provided with terminal rollers 12 adapted to bear against a brake band or eccentric 13.

The brake band is disposed eccentric to the shaft 7 and spaced inwardly from the rim of the pulley 6 by depending spokes 14 preferably formed integral with the rim, as best shown in Fig. 1 of the drawings.

The casting or driving member 5 is provided with a centrally disposed annular recess forming a valve chamber 15 the side walls of which are provided with ports 16 which communicate with the cylinders 10 and thereby permit the free circulation of a body of oil, air gas or other fluid contained within the several cylinders.

One of the side walls of the valve chamber 15 is formed by a tube or bushing 18 threaded at 19 in the flange 8, and provided with terminal threads for the reception of a correspondingly threaded cap 20 which constitutes a closure for the adjacent end of said valve chamber, and is secured to the flange 9 by bolts or other suitable fastening devices 21.

Slidably mounted in the chamber 15 is a cylindrical valve 22 to which are secured longitudinal operating rods 23 the free ends of which extend through suitable openings in the cap 20 and also through glands 24 carried by the cap for attachment to a grooved ring or collar 25, the latter being slidably mounted on the shaft 7 and provided with a hand operated lever 26 by means of which the valve may be moved to open and closed position.

It will thus be seen that by operating the lever 26 the valve may be moved to close or partially close the ports 16 and thereby regulate the flow of fluid within the cylinders 10 so as to cause the pistons 11 to exert more or less pressure on the eccentric 13 and consequently vary the speed of the driving member with respect to the driven member.

In order to prevent undue pressure on the valve 22 when the latter is in open position or moved to partially closed position, said valve is drilled, cast, or otherwise formed with a plurality of longitudinal recesses or passages 27 which permit the fluid to flow through the valve and thereby allow the latter to be firmly seated when in both open and closed position and also relieves the valve of the pressure of the fluid.

The oil or other fluid is introduced within the several cylinders through a pressure oil cup 28 preferably threaded in the flange 9 and communicating with the valve chamber, as shown, the oil being forced through the passages in the valve when the latter is partially opened and thence through the ports 16 into the cylinders 10.

The pistons 11 are preferably disposed at right angles to each other as shown and are provided with suitable packing rings 29 to prevent escape of the oil or other fluid.

In operation motion is imparted to the driving member 5 through the medium of the shaft 7, and the valve being in open position the fluid is free to flow from one cylinder to another as said pistons are alternately depressed or moved inwardly towards the shaft by engagement with the eccentric. When the valve is closed so as to prevent the escape of liquid from the cylinders 10 the rotation of the driving member 5 will cause the rollers 12 to engage and clutch the eccentric thereby imparting motion to the driven member 6. When the valve is only partially closed, the area of the ports 16 being reduced the movement of the fluid by the pistons will be retarded, and the member 6 permitted to rotate relatively to the member 5 at a speed proportionate to the retardation of the fluid and thus vary the speed of the driven element with respect to the driving element.

In Fig. 3 of the drawings there is illustrated a modified form of the invention in which the wheel 30 is the driving member and the pulley or casting 31 the driven member. In this case the wheel 30 is keyed to the shaft 7' and provided with laterally extended brackets 32 carrying the eccentric 13', the latter being adapted to engage the pistons 11' and rotate the driven member 31 in the manner before described. If desired however, the casting or driving member may be constructed and operated without the use of the shaft and the pistons may be operated by suitable gears or cranks.

While the several pistons are preferably arranged at right angles to each other it is obvious that they may be disposed at any angle, and that any number of said pistons may be employed without departing from the spirit of the invention.

Having thus described the invention what is claimed is—

1. In variable speed mechanism, a driving element, a driven element, an actuating member carried by one of said elements, a plurality of pistons carried by the other element and adapted to engage the actuating member, a body of fluid circulating between the pistons, a valve for controlling the circulation of fluid and having a recess formed therein to permit the passage of said fluid, means for operating the valve, and means communicating with the recess at one end of the valve for supplying fluid through the valve to the pistons.

2. In variable speed mechanism, a driving element, a driven element, an actuating member carried by one of said elements, a plurality of pistons carried by the other element and adapted to engage the actuating member, a body of fluid circulating between the pistons, a valve chamber, a flange extended laterally from one of said elements and forming a continuation of the walls of the valve chamber, a valve seated in the chamber for controlling of the circulation of fluid and having longitudinal recesses formed therein to permit the passage of fluid, means for operating the valve, and means extending through the walls of the flange for supplying fluid through the valve to the pistons.

3. In variable speed mechanism, a driving element, a driven element, an actuating member carried by one of said elements, a plurality of pistons carried by the other element and adapted to engage the actuating member, a body of fluid circulating between the pistons, a hollow valve for controlling the circulation of fluid and having smooth unobstructed side walls and provided with longitudinal recesses to permit the passage of the fluid, a bushing engaging the interior walls of the valve, means for operating the valve, and means for supplying fluid through the valve to the pistons.

4. In variable speed mechanism, a driving element and a driven element, one of which is provided with a valve chamber, a flange extending laterally from one element and forming a continuation of the walls of the valve chamber, a plurality of cylinders having ports communicating with the valve chamber, an eccentric carried by the other element, pistons operating within the cylinders and adapted to engage the eccentric, a body of fluid circulating in the cylinders, a valve seated in the chamber for controlling the flow of fluid and having longitudinal fluid passages formed therein, a cap engaging the free end of the flange and provided with perforations, means extending through the perforations and connected to the valve for operating the latter, and an oil cup extending through the walls of the flange for supplying fluid through the valve to the pistons.

5. In variable speed mechanism, a driving element and a driven element one of which is provided with a valve chamber, a bushing forming one wall of the valve chamber, a plurality of cylinders having ports communicating with the valve chamber, an eccentric carried by the other element, pistons operating within the cylinders and adapted to engage the eccentric, a body of fluid circulating within the cylinders, a valve seated in the chamber for controlling the flow of liquid and provided with longitudinal fluid passages, a cap threaded on the bushing and constituting a closure for one end of the valve-chamber, a valve-operating member, rods extending through the cap and connecting the valve and valve operating member, respectively, and means for supplying fluid through the valve to the pistons.

6. In variable speed mechanism, the combination of a shaft, of a driving element keyed to the shaft and provided with lateral flanges, a pulley journaled on the flanges and constituting the driven element, an eccentric carried by the pulley, a valve chamber formed in the driving element, a plurality of cylinders communicating with the valve chamber, pistons operated within the cylinders and provided with rollers adapted to engage the eccentric, a valve seated in the chamber for controlling the flow of fluid, said valve being provided with a series of spaced longitudinal recesses to permit the passage of the fluid, means for operating the valve, and an oil-cup communicating with the valve chamber for supplying fluid through the valve to the cylinders.

In testimony that we claim the foregoing as our own, we have hereto affixed our signatures in the presence of two witnesses.

JAMES ANDREW GOODNER.
ALBERT PAUL KENDIG.

Witnesses:
   A. L. KELLOGG,
   D. W. BARKLEY, Jr.